Figure 1:
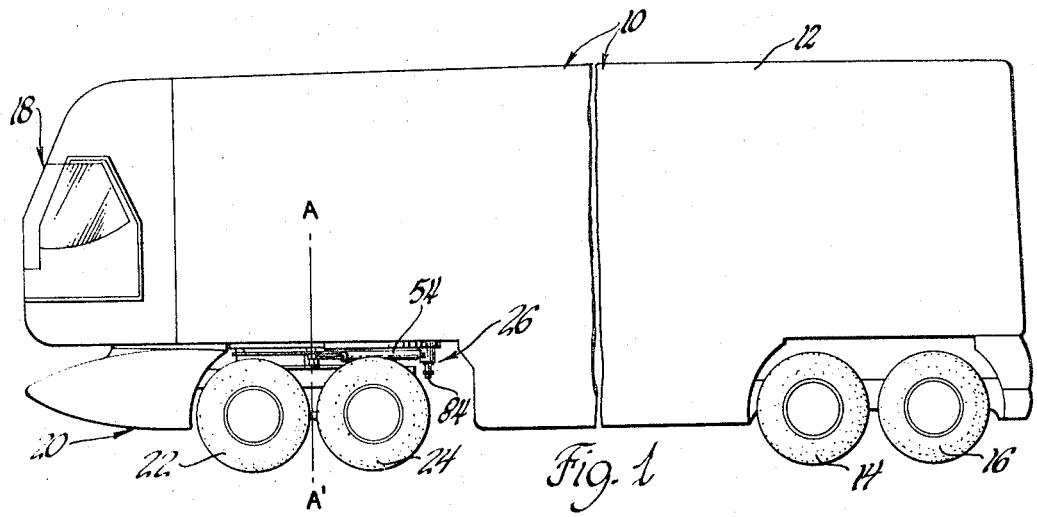

July 25, 1967     T. R. GONDERT     3,332,509

STEERING MECHANISM

Filed May 11, 1965             2 Sheets-Sheet 1

INVENTOR.
Theodore R. Gondert
BY
C. J. Biskup
ATTORNEY

INVENTOR.
Theodore R. Gondert
BY
E. J. Biskup
ATTORNEY

United States Patent Office 3,332,509
Patented July 25, 1967

3,332,509
STEERING MECHANISM
Theodore R. Gondert, Romeo, Mich., assignor to General Motors Corporation, Detroit, Mich., a corporation of Delaware
Filed May 11, 1965, Ser. No. 454,840
16 Claims. (Cl. 180—79.2)

This invention concerns a steering mechanism and more particularly a novel steering arrangement which permits the turning radius of a vehicle to be selectively decreased so that increased maneuverability is realized.

The term "turning radius" as used hereinafter in describing the invention refers to the minimum turning radius of a vehicle realized upon full locked turn of the steering wheel in either direction.

Vehicle designers are currently thinking of substituting a unitized truck for the so-called highway "semi" trucks. As is well-known, the "semi" consists of a tractor and a trailer, both of which are interconnected by a "fifth" wheel in a manner which permits relative articulation between the units to either side of the straight-ahead position so that the vehicle can be maneuvered over a large steering range. The unitized truck would not require a tractor as a prime mover but instead would have the forward portion of the vehicle supported by a wheeled bogie which could incorporate the power package and suitable gearing for driving the wheels. Some of the advantages of a unitized truck are that there are no possibilities of jack-knifing and a greater cargo volume is available than that provided by present day tractor-trailers of similar dimensions. However, a problem in maneuverability is posed by such a design inasmuch as it is essentially a straight truck so far as steering is concerned and therefore it would be difficult to properly maneuver the vehicle in loading dock areas.

One object of the present invention is the provision of an improved steering mechanism for a vehicle. Another object of the invention is to provide a steering device for a vehicle which provides a predetermined steering range for normal road driving and an increased steering range at times when needed. A still further object is the provision of a steering mechanism employing a fluid expandable motor which has one end thereof adjustable for varying the turning radius of a vehicle.

The above objects and others are accomplished in accordance with the invention with a steering mechanism which in one form is incorporated with a vehicle having first and second frame sections pivotally interconnected about a vertical steering axis for relative steering articulation therebetween to either side of straight-ahead steering alignment of the frame sections. The steering mechanism includes a pair of pressure operated steering jacks connected between the respective frame sections on opposite sides of the steering axis. A curved track having the steering axis as its center is secured to one of the frame sections and has a carriage normally locked in position thereto along the longitudinal axis of the vehicle. With the carriage in this position, full expansion and contraction of the respective steering jacks gives the vehicle a predetermined turning radius. In order to realize a turning radius which is less than the predetermined amount, means are provided for unlocking the carriage from the track, after which energization of the jacks causes the carriage to be moved to another position along the track. Subsequently, the carriage can be locked to the track again after which expansion and contraction of the jacks cause the vehicle to be steered about a turning radius which is less than the predetermined turning radius.

Figure 2:
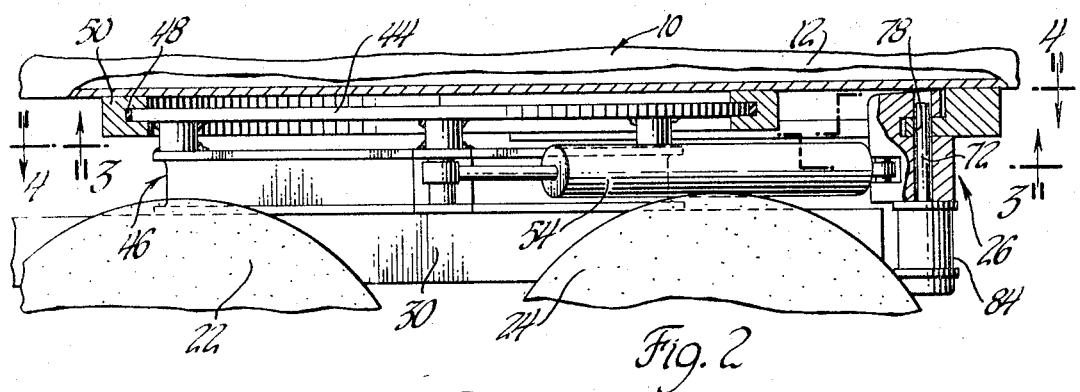
Figure 3:
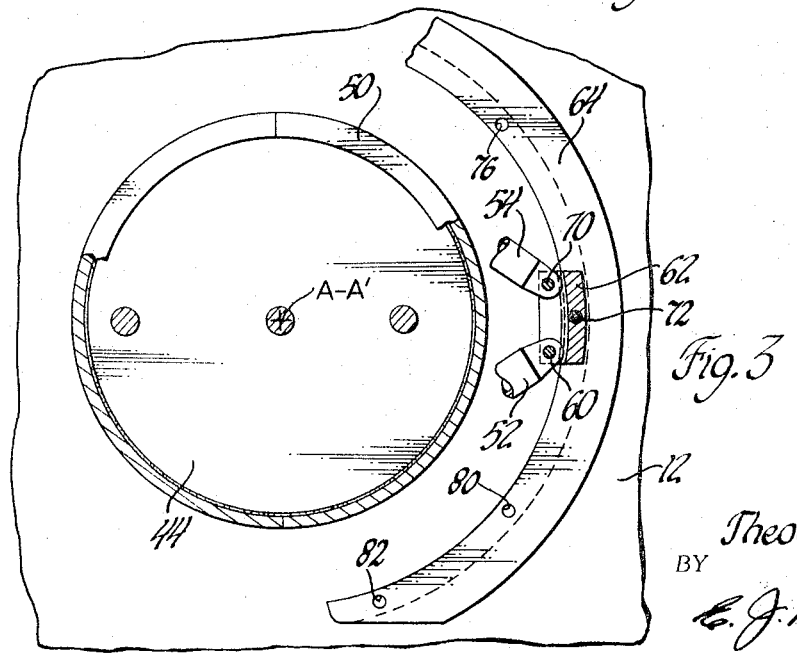
Figure 4:
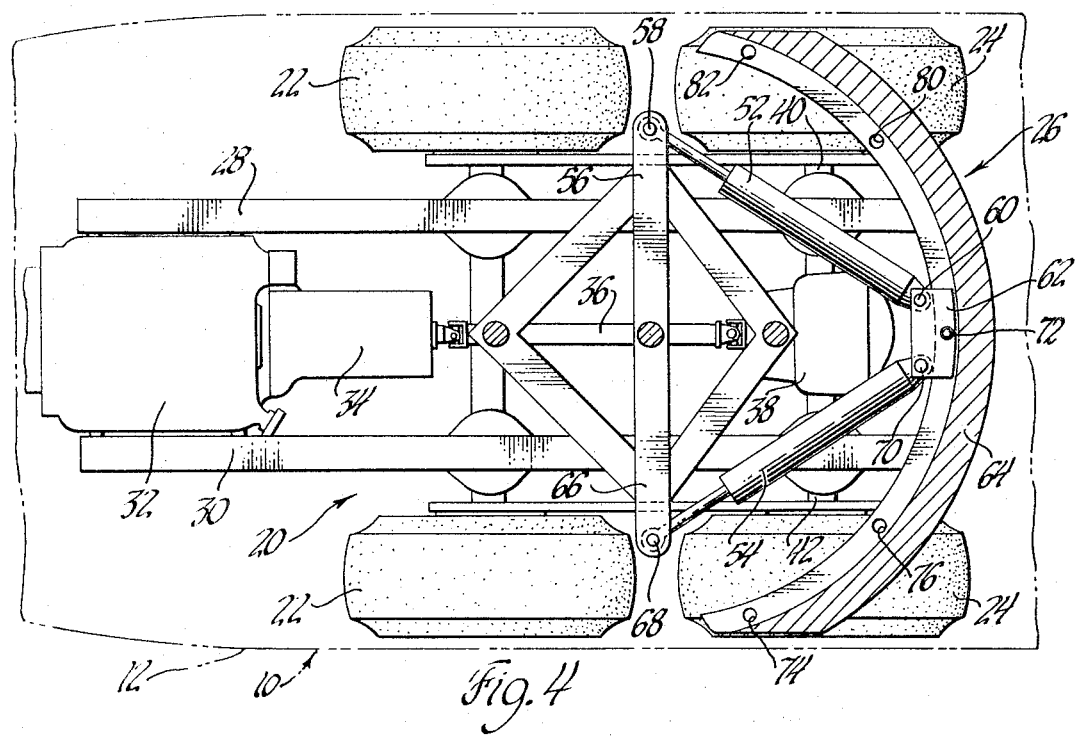
Figure 5:
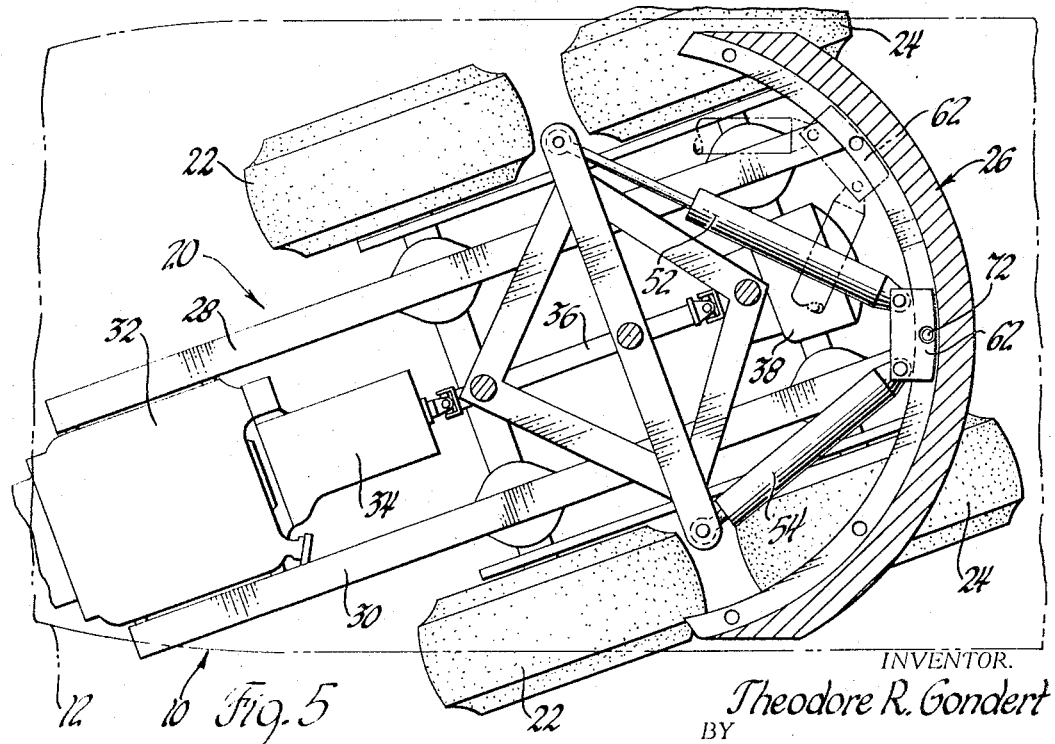

A more complete understanding of the invention can be obtained from the following detailed description when considered together with the drawings in which:

FIGURE 1 shows a unitized truck incorporating a steering mechanism made in accordance with the invention;
FIGURE 2 is an enlarged elevation view showing the details of the steering mechanism;
FIGURE 3 is a view taken on line 3—3 of FIGURE 2;
FIGURE 4 is a plan view of the steering mechanism taken on line 4—4 of FIGURE 2, and
FIGURE 5 is similar to FIGURE 4 but shows one position of the bogie as a result of actuation of the steering mechanism.

Referring now to the drawings and more particularly to FIGURE 1 thereof, a unitized truck 10 is shown having a van type body 12 supported at its rear end by tandem wheels 14 and 16. The forward end of the body 12 is provided with an operator's station 18 which is located above and slightly forward of a bogie 20 which supports the forward end of the body. The bogie 20 is also provided with tandem wheels 22 and 24 and incorporates a steering mechanism 26 that is adapted to rotate the bogie about a vertical axis A–A' for steering purposes.

In this particular design of the vehicle, the bogie 20 is intended to be a self-contained unit which is equivalent to the tractor currently used with highway "semi" trucks. In other words, as seen in FIGURE 4, the bogie 20 has a chassis comprising a pair of longitudinally extending frame members 28 and 30 that suitably support an internal combustion engine 32 which is connected through a transmission 34 and drive shaft 36 to a differential 38. As conventional, the differential directs drive through appropriate line axles 40 and 42 to the wheels 24. Although not shown, suspension means are provided between the vehicle frame and the wheels for limiting the amount of road shock transferred to the vehicle body.

As best seen in FIGURES 2 and 3, the bogie 20 is connected to the body 12 through a fifth wheel arrangement which consists of a disk-shaped member 44 that is rigidly connected to a subframe 46 which in turn is secured to the frame members 28 and 30. The outer circumferential edge of the disk member 44 is accommodated by an annular groove 48 formed in a ring member 50 which is fixedly secured to the underside of the body 12. Thus, the bogie 20 is adapted to rotate about the pivot axis A–A' which is located in the approximate center of the disk member.

The steering mechanism 26 for rotating the bogie is shown in FIGURES 2, 3 and 4 and comprises a pair of double-acting fluid operated steering jacks 52 and 54. As is conventional, each steering jack includes a piston member and cylinder member which are relatively movable with respect to each other under the influence of compressed fluid. Although not shown, each steering jack will have appropriate ports at the forward and rear ends of the cylinder member that will supply an exhaust fluid to and from the associated jack in response to movement of the steering wheel located in the operator's station. Systems of this sort are well-known in the art and therefore it is not deemed necessary to described the type of valving and auxiliary components which would be associated with the steering wheel for accomplishing alternate expansion and contraction of the jacks.

As best seen in FIGURE 4, the rod end of the steering jack 52 is pivotally connected to an arm 56 of the subframe 46 at a point 58 while the cylinder end is pivotally connected at a point 60 to a carriage 62 which is normally locked in position on an arcuate guide track 64 fixed to the underside of the body 12 and having the steer axis A–A' as its center. The steering jack 54 is similarly pivotally connected at its rod end to an arm 66 at a point 68 while the cylinder end is pivotally connected to the carriage 62 at a point 70.

The carriage 62 is provided with a solenoid operated reciprocable plunger 72 which is adapted to move into and out of locking engagement with appropriate apertures 74, 76, 78, 80 and 82 formed at equally spaced points along the arcuate track 64. In the normal highway driving position of the steering mechanism, the carriage 62 will be located at a point in line with the longitudinal axis of the body as seen in FIGURE 4. In this position of the carriage 62, full expansion of jack 52 and contraction of jack 54 causes the bogie 20 to be rotated about the steer axis A–A′ to the position shown in FIGURE 5 so that the vehicle has a predetermined turning radius. Thus, a vertical plane passing through the centers of the wheels 22 and 24 of the bogie will make an angle of approximately 25° with respect to the longitudinal axis of the body or give a steering range to either side of straight-ahead position of approximately 50°. This amount of steering is sufficient for normal highway driving; however, in areas such as loading docks, increased maneuverability of the vehicle is required. In such cases, the solenoid 84 incorporated with the plunger 72 would be energized so as to remove the latter from the aperture 78 in the track. This can be accomplished by simply providing a manually operated switch in the operator's station in a place which would be conveniently accessible for the driver. Once the plunger is retracted from the track and assuming the bogie 20 is in the position of FIGURE 5 and it is desired to move the bogie further counterclockwise about the steering axis A–A′, then the steering wheel would be rotated clockwise so as to fully expand and contract the steering jacks 54 and 52, respectively. This would then result in a repositioning of the carriage 62 to an area, as shown in phantom lines of FIGURE 5, where the plunger 72 will be aligned with the aperture 80 in the track. Deenergization of the solenoid permits a spring to extend the plunger 72 into the aperture 80 and thereby once again lock the carriage 62 to the track 64. Thereafter, the steering wheel is rotated in a counterclockwise direction resulting in contraction and expansion of the steering jacks 54 and 52, respectively, so as to continue rotation of the bogie in the desired direction to increase the angle between the aforesaid plane of the wheels and the longitudinal axis of the body by an additional 20° to 25°. This procedure can be repeated for purposes of locating and locking the carriage 62 in the aperture 82 at which time the bogie 20 can be positioned normal to the longitudinal axis of the vehicle. It should be apparent that for increased clockwise rotation of the bogie 20 the carriage 62 would be moved in increments to positions adjacent to the apertures 76 and 74 in a manner similar to that described above.

Various changes and modifications can be made in this construction without departing from the spirit of the invention. Such changes and modifications are contemplated by the inventor who does not wish to be limited except by the scope of the appended claims.

I claim:

1. In combination with a vehicle having a frame member, a wheel carrying axle member connected to said vehicle and movable about a vertical axis for steering purposes, a guide track rigidly connected with one of said members, a carriage mounted on said guide track for movement relative to said axle member, a linear force transmitting member having the opposite ends pivotally connected to the axle member and the carriage respectively and adapted to rotate said axle member about said vertical axis, and means for locking said carriage at different positions along said track so as to vary the effective turning radius of the vehicle.

2. In combination with a vehicle having a frame member, a wheel carrying axle member supporting said vehicle and movable about a vertical axis for steering purposes, a transversely extending arcuate guide track rigidly connected with one of said members, a carriage mounted on said guide track for movement relative to said axle member, a linear force transmitting member having the opposite ends connected to the axle member and the carriage respectively and adapted to rotate said axle member about said vertical axis, and means for locking said carriage at different positions along said track so as to vary the effective turning radius of the vehicle.

3. In combination with a vehicle having a frame member, a wheel carrying axle member connected to said vehicle and movable about a vertical axis for steering purposes, a guide track connected to one of said members, a carriage normally locked in position on said guide track and adapted for movement relative to the axle member, a linear force transmitting member having the opposite ends connected to the axle member and the carriage respectively and adapted upon full extension to rotate said axle member about said vertical axis so that the vehicle has a predetermined turning radius, and means for unlocking said carriage whereby full contraction of said force transmitting member causes the carriage to move relative to the axle member to another position along said track so that subsequent locking of said carriage in said other position and extension of said force transmitting member causes a decrease in the effective turning radius of the vehicle.

4. In combination with a vehicle having a frame member, a wheel carrying axle member connected to said vehicle and movable about a vertical axis for steering purposes, an arcuate guide track rigidly connected with one of said members, a carriage normally locked in position on said guide track and adapted for movement relative to the axle member, a linear force transmitting member having the opposite ends connected to the axle member and the carriage respectively and adapted upon full extension to rotate said axle member about said vertical axis so that the vehicle has a predetermined turning radius, and means for unlocking said carriage whereby full contraction of said force transmitting member causes the carriage to move relative to the axle member to another position along said track so that subsequent locking of said carriage in said other position and extension of said force transmitting member causes a decrease in the effective turning radius of the vehicle.

5. In combination with a vehicle having a frame member, a wheel carrying axle member connected to said vehicle and movable about a vertical axis for steering purposes, an arcuate guide track rigidly connected to one of said members and located on a circle having said axis as its center, a carriage normally locked in position on said guide track and adapted for movement relative to the axle member, a linear force transmitting member having the opposite ends connected to the axle member and the carriage respectively and adapted upon full extension to rotate said axle member about said vertical axis so that the vehicle has a predetermined turning radius, and means for unlocking said carriage whereby full contraction of said force transmitting member causes the carriage to move relative to the axle member to another position along said track so that subsequent locking of said carriage in said other position and extension of said force transmitting member causes a decrease in the effective turning radius of the vehicle.

6. In combination with a vehicle having a frame member, a wheel carrying axle member connected to said vehicle and movable about a vertical axis for steering purposes, an arcuate guide track rigidly connected with one of said members, a carriage normally locked in position on said guide track along the longitudinal axis of the vehicle and adapted for movement relative to the axle member, a linear force transmitting member having the opposite ends pivotally connected to the axle member and the carriage respectively and adapted upon full extension to rotate said axle member about said vertical axis so that the vehicle has a predetermined turning radius, and means for unlocking said carriage whereby full contraction of said force transmitting member causes the carriage to move relative to the axle member to another position along said track so that subsequent locking of said carriage in said other position and extension of said force transmitting member causes a decrease in the effective turning radius of the vehicle.

7. In combination with a vehicle having a frame member, a wheel carrying axle member connected to said vehicle and movable about a vertical axis for steering purposes, a guide track rigidly connected to one of said members and located on a circle having said axis as its center, a carriage normally locked in position on said guide track along the longitudinal axis of the vehicle and adapted for movement relative to the axle member, a linear force transmitting member having the opposite ends connected to the axle member and the carriage respectively and adapted upon full extension to rotate said axle member about said vertical axis so that the vehicle has a predetermined turning radius, and means for unlocking said carriage whereby full contraction of said force transmitting member causes the carriage to move relative to the axle member to another position along said track so that subsequent locking of said carriage in said other position and extension of said force transmitting member causes a decrease in the effective turning radius of the vehicle.

8. In combination, a vehicle comprising first and second frame sections, means pivotally interconnecting said frame sections on a steering axis for relative steering articulation therebetween to either side of straight-ahead steering alignment of said frame sections, a fluid pressure operated steering jack including relatively reciprocable piston and cylinder members, means connecting one of said members to one of said frame sections at a point offset from said steering axis, a transverse guide track secured to the other of said frame sections, a carriage normally locked in position on said track along the longitudinal axis of the vehicle, means connecting the other of said members to said carriage whereby maximum expansion of said jack results in relative movement of said frame sections so that said vehicle is steered about a predetermined turning radius, means for unlocking said carriage from said track whereby contraction of said jack causes said carriage to be moved along the track and located at another position on said track so that subsequent locking of the carriage and maximum expansion of said jack causes said vehicle to be steered about an effective turning radius less than said predetermined turning radius.

9. In combination, a vehicle comprising first and second frame sections, means pivotally interconnecting said frame sections on a vertical steering axis for relative steering articulation therebetween to either side of straight-ahead steering alignment of said frame sections, a double-acting steering jack including relatively reciprocable piston and cylinder members, means pivotally connecting one of said members to one of said frame sections at a point offset from said steering axis, a curved track secured to the other of said frame sections and located on a circle having said axis as its center, a carriage normally locked in position on said track along the longitudinal axis of the vehicle, means pivotally connecting the other of said members to said carrriage whereby maximum expansion of said jack results in relative movement of said frame sections so that said vehicle is steered about a predetermined turning radius, means for unlocking said carriage from said track whereby contraction of said jack causes said carriage to be located at another position along said track so that subsequent locking of the carriage and maximum expansion of said jack causes said vehicle to be steered about an effective turning radius less than said predetermined turning radius.

10. In combination, a vehicle comprising first and second frame sections, means pivotally interconnecting said frame sections on a steering axis for relative steering articulation therebetween to either side of straight-ahead steering alignment of said frame sections, a fluid pressure operated steering jack including relatively reciprocable piston and cylinder members, means pivotally connecting one of said members to one of said frame sections at a point offset from said steering axis, a curved track secured to the other of said frame sections, a carriage normally locked in position on said track along the longitudinally axis of the vehicle, means pivotally connecting the other of said members to said carriage whereby maximum expansion of said jack results in relative movement of said frame sections so that said vehicle is steered about a predetermined turning radius, means for unlocking said carriage from said track whereby contraction of said jack causes said carriage to be located at another position along said track so that the subsequent locking of the carriage and maximum expansion of said jack causes vehicle to be steered about an effective turning radius less than said predetermined turning radius.

11. In combination, a vehicle comprising first and second frame sections, means pivotally interconnecting said frame sections on a steering axis for relative steering articulation therebetween to either side of straight-ahead steering alignment of said frame sections, a pair of fluid pressure operated steering jacks including relatively reciprocable piston and cylinder members, means pivotally connecting one of said members of each jack to one of said frame sections at points on opposite sides of said steering axis, a curved track secured to the other of said frame sections, a carriage normally locked in position on said track along the longitudinal axis of the vehicle, means pivotally connecting the other of said members of each jack to said carriage whereby maximum expansion of one of said jacks and contraction of the other results in relative movement of said frame sections so that said vehicle is steered about a predetermined turning radius, means for unlocking said carriage from said track whereby contraction of said one of said jacks and expansion of said other causes said carriage to be located at another position along said track so that subsequent locking of the carriage and maximum expansion of said one of said jacks and contraction of the other causes said vehicle to be steered about an effective turning radius less than said predetermined turning radius.

12. The combination of claim 10 wherein said means for unlocking said carriage comprises a solenoid.

13. The combination of claim 10 wherein said carriage supports a plunger type bolt for locking the carriage to the track.

14. The combination of claim 13 wherein said track is formed with a plurality of equally spaced apertures for accommodating said bolt.

15. In combination with a vehicle, a steerable axle assembly supporting rotatable wheels at the opposite ends thereof, a force transmitting member connected between said vehicle and said axle assembly, and means providing for adjustable repositioning of one end of the force transmitting member relative to the axle assembly so as to vary the effective turning radius of the vehicle.

16. In combination with a vehicle, a steerable axle assembly supporting rotatable wheels at the opposite ends thereof and movable about a vertical axis for steering purposes, a force transmitting member connected between said vehicle and said axle assembly for rotating said axle assembly about said axis, and means providing for adjustable repositioning of one end of the force transmitting member along an arc having said axis as its center and relative to the axle assembly so as to vary the effective turning radius of the vehicle.

References Cited

UNITED STATES PATENTS 2,676,664   4/1954   Richter.
3,048,422   8/1962   Payne et al. _____ 280—81.5

BENJAMIN HERSH, *Primary Examiner.*

J. H. BRANNEN, *Assistant Examiner.*